United States Patent [19]
Calderon

[11] 4,376,033
[45] Mar. 8, 1983

[54] METHOD FOR RECOVERING SHALE OIL FROM SHALE

[76] Inventor: Albert Calderon, 1065 Melrose Dr., Bowling Green, Ohio 43402

[21] Appl. No.: 209,831

[22] Filed: Nov. 24, 1980

[51] Int. Cl.³ .................. C10G 1/00; E21C 41/10; B09B 3/00
[52] U.S. Cl. .................. 208/11 R; 299/18; 405/128
[58] Field of Search .......... 208/11 R; 299/13, 18; 405/128, 267

[56] References Cited

U.S. PATENT DOCUMENTS

| | | | |
|---|---|---|---|
| 2,509,921 | 5/1950 | Gwynn | 75/90 R |
| 2,701,787 | 2/1955 | Hemminger | 208/11 R |
| 3,117,072 | 1/1964 | Eastman | 208/11 R |
| 3,118,746 | 1/1964 | Stratford | 208/11 R |
| 3,377,266 | 4/1968 | Salnikov | 208/11 R |
| 3,509,027 | 4/1970 | Savage | 208/11 R |
| 3,929,615 | 12/1975 | Linden | 208/11 R |
| 4,060,479 | 11/1977 | Barcellos | 208/11 R |

Primary Examiner—T. Tufariello
Attorney, Agent, or Firm—Yount & Tarolli

[57] ABSTRACT

An improved method and apparatus for recovering shale oil from shale wherein the shale is mined, crushed and pyrolized electrically in surface facilities by induction in a chamber made up of a plurality of cells in the absence of air and the raw gases are directed to a condensing means for separating the liquids from the gases. The invention also describes a method and apparatus for making use of the residue from the liquids separated from the gas in order to use said residue economically and generate electric power for the induction system used in the instant invention. The invention further discloses means for the recovering of the heat energy contained in the spent shale. The invention also discloses a method and apparatus for the disposal of the spent shale in an environmentally acceptable manner in order to prevent pollution and save the great quantities of water needed for reclamation.

48 Claims, 13 Drawing Figures

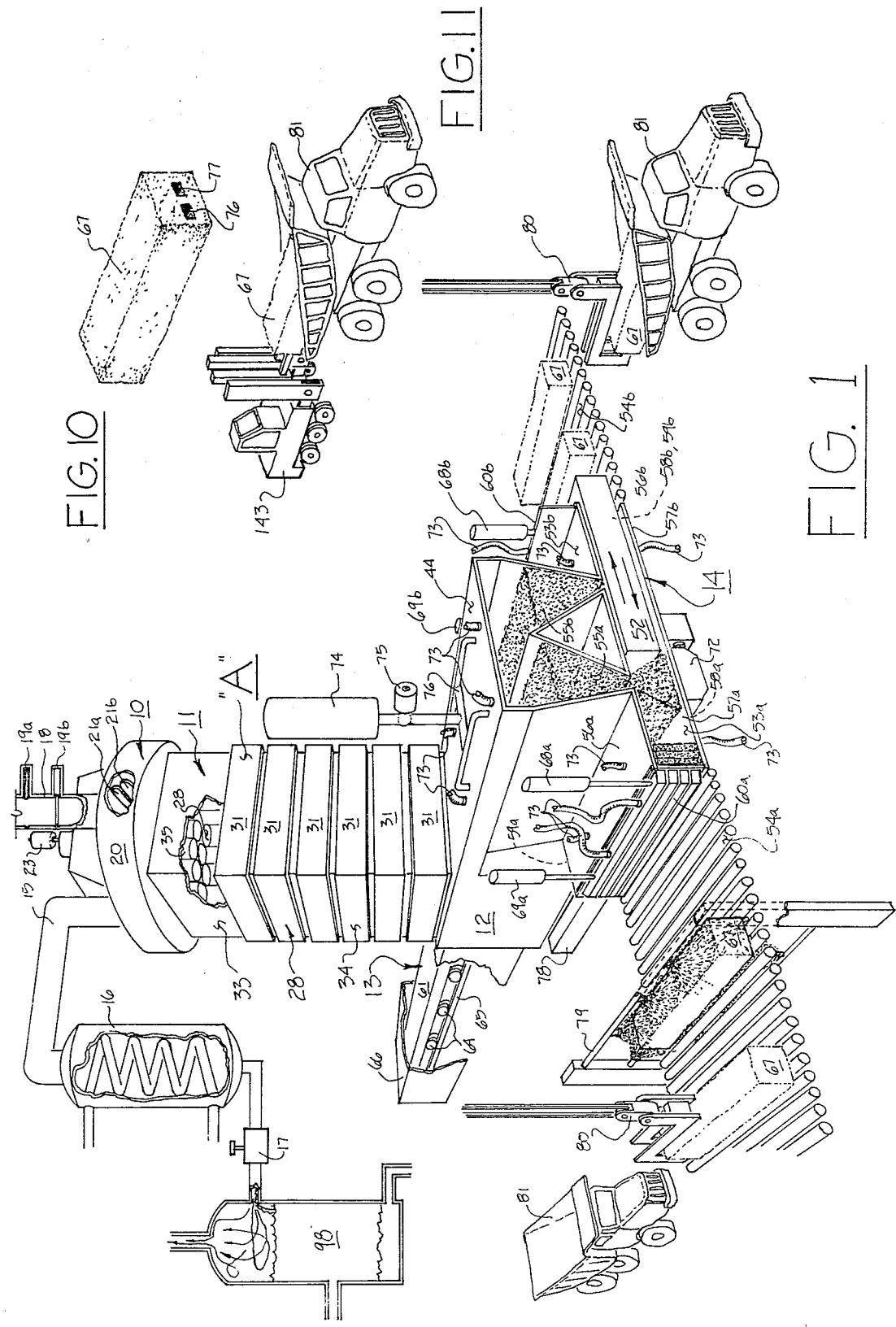

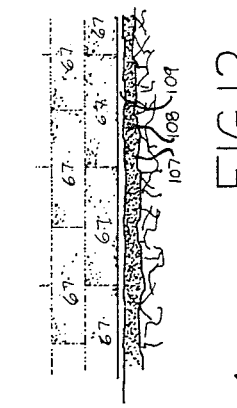
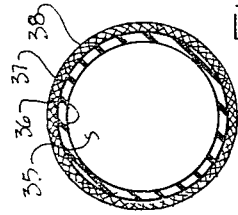
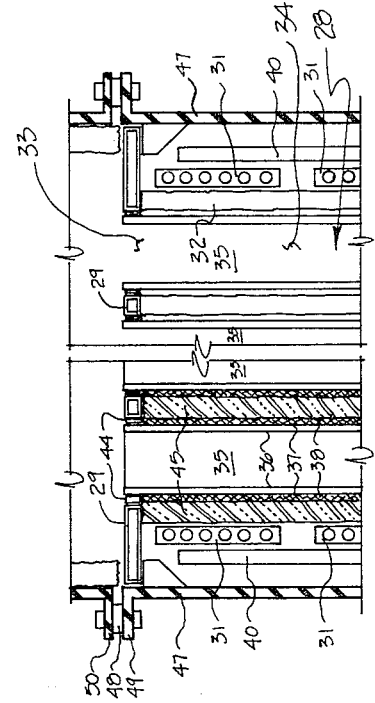
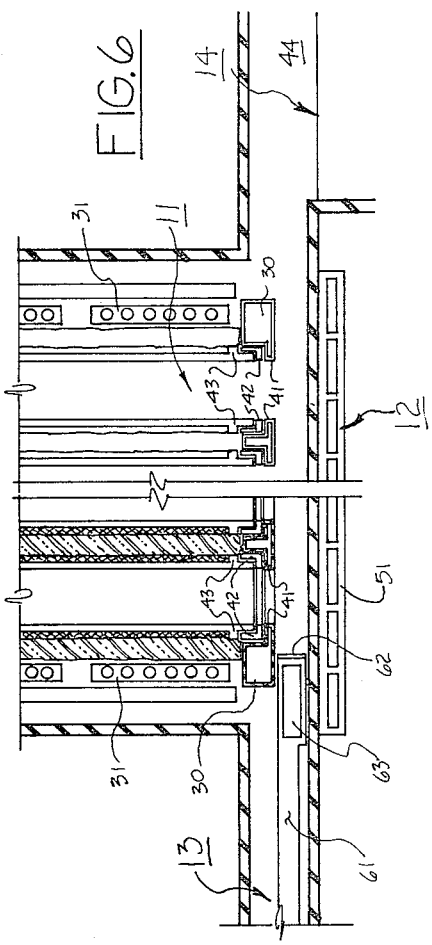
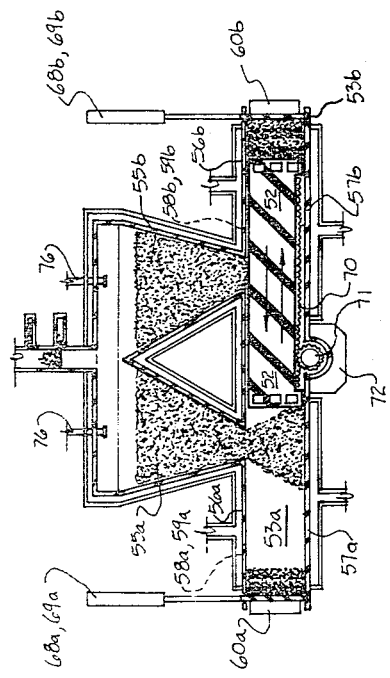
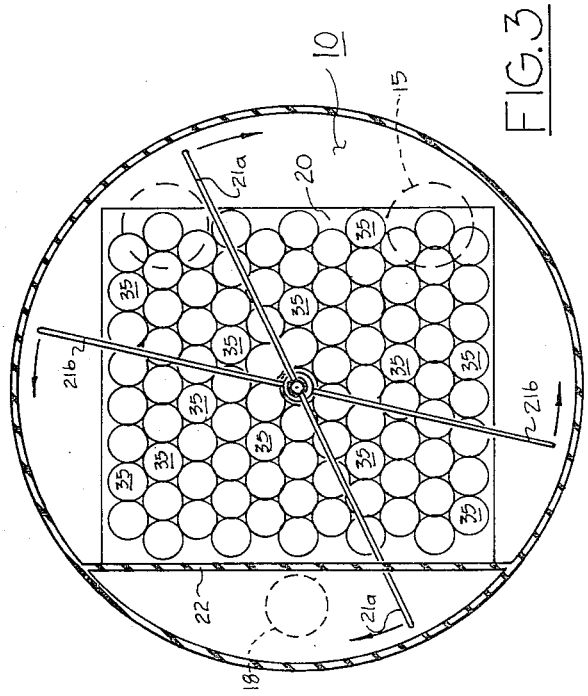

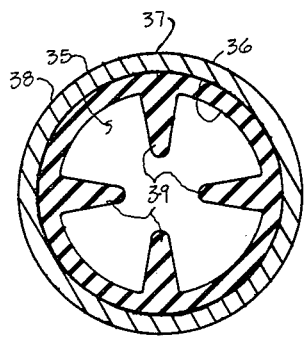
FIG. 5
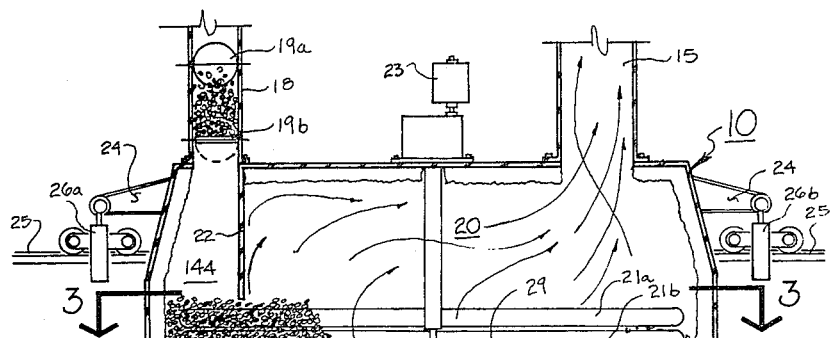
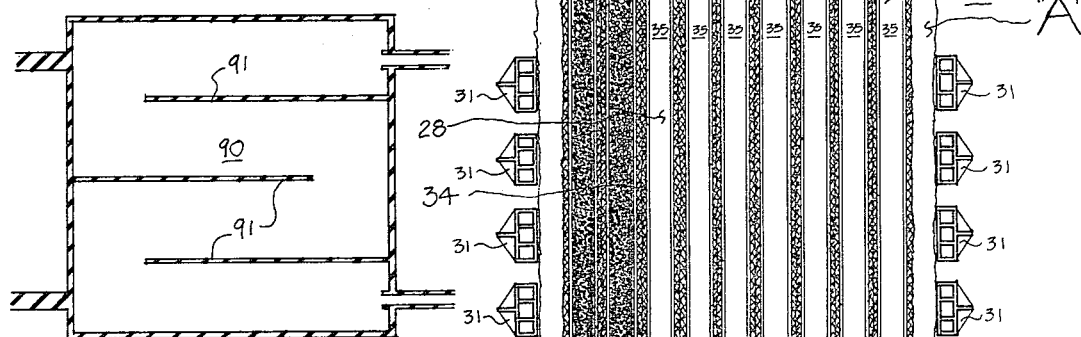
FIG. 9
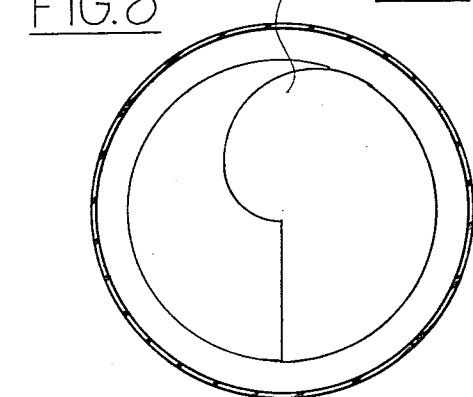
FIG. 8
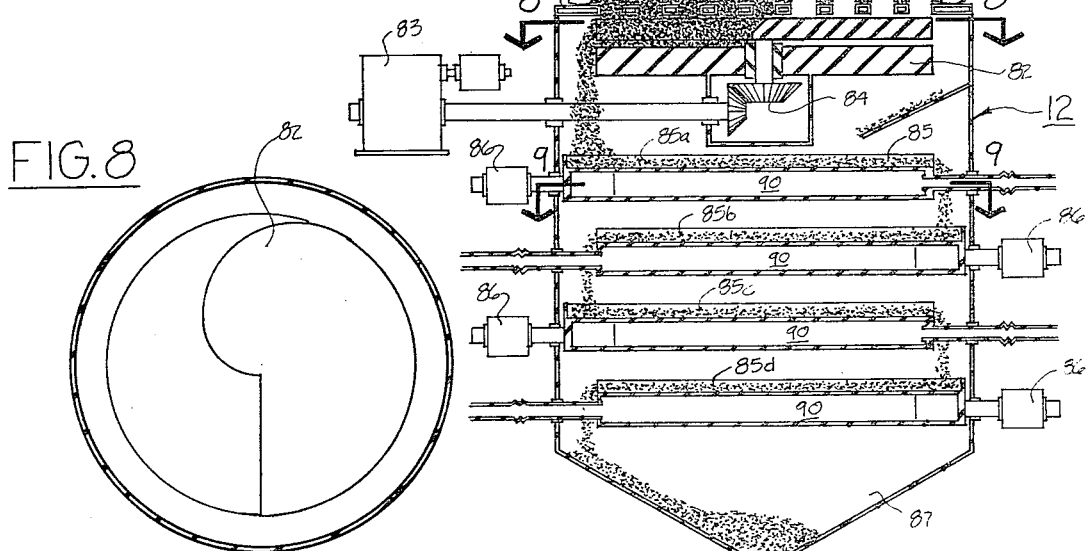
FIG. 2
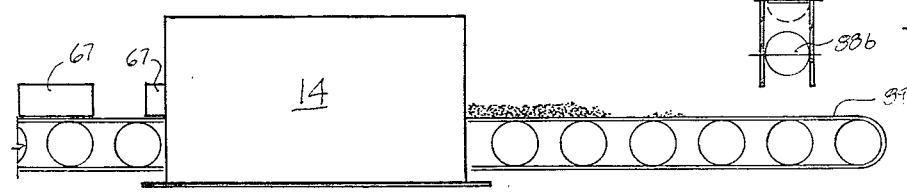

METHOD FOR RECOVERING SHALE OIL FROM SHALE

The present invention relates to the recovery of shale oil from shale. The current methods of recovering oil from shale by means of surface retorts are many; they include a vertical shaft, a circular grate, a rotary kiln, a screw mixer, and an up-flow kiln. The present invention relates to the vertical shaft in which the shale is processed while the shale descends within the shaft.

Generally, in the vertical shaft the oil shale is processed with flue gas resulting from the combustion of the residue (coke) contained in the spent shale, or by an indirect method which makes use of ceramic balls that are heated externally, the heat from the balls being transferred to the shale to pyrolyze it during its descent within the shaft. The advantages of the method using the flue gas are that it is thermally efficient and the spent shale leaving the retort is relatively cool. The disadvantages of this direct method of heating are that it cannot use rich shale because of caking that results during pyrolysis, it is difficult to control, dilution takes place because of the great quantities of nitrogen in the gas stream since the residue is burned with air, it is difficult to scale up, and the clean-up of the products of combustion is expensive. The advantages of the system using the ceramic balls are that it can use rich shale, the gas stream is not diluted, and the gas clean-up is simpler. The disadvantages of this indirect method are that it is not so efficient, the spent shale is rejected at an elevated temperature, it does not scale-up, and it is mechanically complicated. The present invention as will be shown incorporates the advantages of both of the above systems and overcomes their disadvantages; further it provides additional important advantages.

In particular the instant invention is an improvement over the method and apparatus for the pyrolysis of oil shale of Salnikov's U.S. Pat. No. 3,377,266 issued on Apr. 8, 1968 which teaches the pyrolysis of shale by the use of electrothermal means made up of resistance heating elements 52 (see column 3, line 18). These resistance elements are in turn made up of elongated metallic rods 54 having an outer jacket of ceramic material 55. The patent further teaches (column 4, line 6) that the outer protective jacket 55 serves "to insulate the rods from direct physical contact with the shale." The patent also teaches that "other forms of electrical heating elements may be employed in the manner prescribed in accordance with the present invention, such as, for example, induction heating elements;". The instant invention teaches a method and apparatus for the pyrolysis of shale using electrothermal means which is an improvement ove Salnikov's and wherein the shaft in which the pyrolysis takes place is made up of a cluster of compartments or cells shown by "c" in the photograph attached and marked Exhibit 1. Each compartment "c" possesses walls "d". The inside of walls "d" are in direct contact with the shale charged. The outside of walls "d" are insulated both thermally as well as electrically by means of insulation "e" so that each cell is isolated in itself without the possibility of ever having the walls of one cell making contact with the walls of an adjacent cell. The whole cluster of cells is in turn insulated by insulation "e" which surrounds the cluster; insulation "e" is provided to thermally insulate the cluster from the induction coil which is water cooled and located in area "a".

It is a fact that Salnikov makes reference to the substitution of resistance heating by induction heating, but Salnikov's patent fails to describe how induction heating would heat the shale in such a manner as to provide efficient heat transfer as taught by the instant invention. Since Salnikov teaches the use of a ceramic insulator between the heating rod and the shale, this manner of heating is indirect and is similar to heating through a refractory wall such as conventional coke ovens wherein one side of a brick wall is heated and the other side is in contact with the coal; Salnikov's patent also fails to teach how short-circuiting and arc-ing will be prevented after wear of the ceramic insulator covering the heating rods takes place since shale is abrasive. Other detrimental problems in Salnikov's patent are blockage in the shaft preventing the direct flow of material which is caused by the interference of the horizontal members of frames 56 which members support heating elements 52; further the excessive heating of the base of each heating rod 54 because of the insulating property of ceramic jacket 55 will occur.

Since the key to the successful pyrolysis of shale is heat transfer coupled to uniformity of heating within the entire shaft of the retort, the instant invention discloses a method and apparatus which is an improvement over Salnikov by providing a cluster of cells which are insulated and isolated from each other wherein the inside walls of the cells are uniformly heated by induction and wherein the inside of said walls are in direct contact with the shale to be pyrolyzed, with no insulation being interposed between the heating walls of the cells and the shale itself. Since the shale does not come into contact with the insulation interposed between the cells, the possibility of wearing out the insulation as taught by Salnikov is eliminated. Such cell structure as disclosed herein is critical for large scale-up by multiplying the number of cells in the cluster and yet having each cell uniformly heated irrespective of its location within the cluster, and without the necessity of having a coil surrounding each cell, and also, always providing very efficient heating of the shale without having concern for the abrasive property of the shale tearing out the insulation taught by Salnikov. In this manner the possibility of arc-ing or short-circuiting between and among the walls of the cells is eliminated. The cells are completely open along their length and may even be made to diverge downwardly to prevent any blockage or bridging in order to insure a semblance of continuity which is an absolute requirement for the commercial extraction of oil from shale.

Spent shale occupies roughly 40% more volume than shale occupies prior to pyrolysis. Besides the need for a retort that overcomes the disadvantages mentioned above, the other two serious problems facing the commercial production of shale is the disposal of spent shale and the utilization of the residue after the condensation of the recovered oil. Generally the disposal of the spent shale takes the form of dumping it into the countryside or a ravine, compacting it, spreading top soil on it, fertilizing it and revegetating it. Great quantities of water are needed for this reclamation. Two-thirds of the water needed in the processing of shale rock for the recovery of shale oil are used for revegetation. Despite attempts at revegetation for solving the problem of disposal of spent shale, dust during wind storms and run-off during rains may contaminate fresh water sources. Material leeching from the spent shale contains high concentrations of partly oxidized organic material as well as sodium, calcium, magnesium, boron, and arsenic and these materials may reach streams or fresh ground water. Another serious problem is the residue (bottoms) after separation of the oil. The shale oil after condensation and separation from the non-condensable gas possesses residue which is equal to 20% of the total oil recovered. This residue which also contains some mineral fines is difficult to handle and presents a problem of disposal.

The instant invention discloses a method and apparatus that is adaptive to the recovery of shale oil from shale in a completely environmentally closed system having very efficient and controllable heat transfer features irrespective of the erosive characteristics of the shale, and which is capable of pyrolyzing commercial quantities of shale uniformly to make the recovery of oil from shale economically commercial. Such quantities are a prerequisite to industrial productivity.

In order to make the commercial recovery of oil from shale viable, about 50,000 barrels of oil per day must be extracted from the rock. This requires the mining and processing of 70,000 tons of rock and the disposal of 60,000 tons of spent shale. The volume of the mined rock is roughly 3 million cubic feet and the volume of the spent shale is 4.2 million cubic feet. Therefore, the main object of the instant invention is to provide a novel method and apparatus for the pyrolysis of shale capable of transfering the heat directly and uniformly to the shale to pyrolyze it efficiently in a completely enclosed system to comply with the Clean Air Act and OSHA standards in order to make the recovery of oil from shale economically viable as well as compatible with the environment.

Another object of the instant invention is to provide an improved method and apparatus for the recovery of oil from shale wherein such recovery is very high by virtue of rapid heating without burning to result in minimum liquid oil losses.

Still an object of the present invention is to provide an improved method and apparatus wherein features for the pyrolysis of the shale make possible the close control of the heating of the shale to result in high yields to minimize the coking of shale oil.

Therefore an object of the invention is to provide an improved method and apparatus that efficiently heats the shale by direct contact at optimum temperature during retorting to prevent the cracking of the oil.

Yet an object of the instant invention is to provide an improved method and apparatus capable of scaling up to commercial scale without sacrificing efficient and direct heating of the shale being pyrolysed in a controlled pattern to result in maximum yield.

Still another object of the instant invention is to provide an improved method and apparatus wherein rich oil shale can be most efficiently pyrolysed by heating the shale in a plurality of compartments or cells whose walls are heated by induction in such a manner as to have the inside walls of said cells in direct contact with the shale and the outer walls of said cells fully insulated to prevent heat losses from the outer walls of said cells.

Therefore another object of the instant invention is to provide an improved method and apparatus to most efficiently pyrolyse shale wherein the shale is contained within a plurality of cells which plurality forms a retort and wherein the outside walls of each cell are insulated and isolated from its adjacent cell both thermally and electrically and wherein no shale comes in contact with the insulation surrounding each cell in order to prevent wear to said insulation so that no short-circuiting or arc-ing ever takes place from cell to cell and in this manner providing a method and apparatus that are dependable and requiring minimum maintenance.

Further another object of the present invention is to provide an improved method and apparatus wherein the shale is distributed uniformly within a plurality of cells whose walls are heated by induction in order to provide uniformity in productivity.

Also another object of the present invention is to provide an improved method and apparatus wherein the shale is heated in a plurality of cells whose walls are heated by induction in such a manner as to provide zonal heating in order to provide selective control to maximize uniform heating as well as productivity.

It is also another object of the present invention to provide an improved method and apparatus wherein the heat transfer from the internal walls of each cell of said plurality of cells, which come in direct contact with the shale to be pyrolysed, is further increased by providing internal fins to said internal walls to project inwardly into the cell to increase direct contact and to hasten the pyrolysis of the shale.

It is therefore also another object of the instant invention to provide an improved method and apparatus wherein provisions are made to prevent interference to the flow of the shale and eliminate bridging by breaking up the shale that cakes and by the outward divergence of the walls of the cells within which the shale is heated.

It is yet also another object of the instant invention to provide an improved method and apparatus wherein provisions are made to pre-heat the shale with gases of devolatilization and to recover the heat from the spent shale.

Yet another object of the present invention is to provide an improved method and apparatus wherein the disposal of spent shale takes place with minimum geographical changes to the environment and without consuming great quantities of water needed for land reclamation.

Still therefore, another object of the instant invention is to provide an improved method and apparatus wherein the spent shale which increases in volume after pyrolysis is compressed into a shape suitable for retirement back to the mine instead of disposing it in the countryside.

Still yet another object of the instant invention is to provide a method and apparatus wherein the spent shale is cooled to recover the sensible heat contained therein and thereby conserve energy.

Still further, another object of the instant invention is to provide an improved method and apparatus wherein the spent shale after pyrolysis is made impermeable to water so that the blocks made from it by compression will not contaminate fresh water sources.

Still yet, another object of the instant invention is to provide an improved method and apparatus wherein shale is mined, crushed, pyrolysed and the recovered oil condensed and separated to result in crude oil and non-condensables, and with the spent shale being disposed back into the mine without causing damage to the environment.

Therefore still, another object of the instant invention is to provide an improved method and apparatus wherein shale is mined, crushed, pyrolysed and the recovered oil is condensed and separated to result in crude oil suitable for refining, residue and non-condensables to be consumed as energy source, and wherein the spent shale being disposed back into the mine affter compression into blocks which blocks are made impermeable to water.

Therefore further, another object of the instant invention is to provide an improved method and apparatus wherein shale is mined, crushed and pyrolysed by using induction heating means and the recovered oil is condensed and separated to result in crude oil to be refined, residue to be gasified and non-condensables to be consumed as energy source for the generation of power to generate electric power for said inducting heating means, and wherein the spent shale together with the minerals from said residue which are not gasifyable are compressed together into blocks which blocks are made impermeable to water and are retired into the mine after laying a water protective covering on the floor of the mine where said blocks are retired in order to remove all possibility of contaminating fresh water sources.

Therefore yet, another object of the instant invention is to provide an improved method and apparatus wherein shale is mined, crushed and pyrolysed by using electric induction heating means to heat the shale within a plurality of cells, and the recovered oil is condensed and separated to result in crude oil to be refined, residue to be gasified and non-condensables to be used as fuel, the gas resulting from gasification and the non-condensables resulting from separation are consumed as energy source for the generation of power by making use of the combined cycle principle, said gas and said non-condensables being desulfurized by means of a desulfurizing agent prior to combustion, and wherein the spent shale together with minerals from said residue which are not gasifiable and together with the spent desulfurizing agent are jointly compressed together into blocks during which time sensible heat is recovered from the materials compressed, said blocks being made impermeable to water by means of a non-degradable material and delivered to the mine where they are stacked on a waterproof floor covering where they are retired in order to remove all possibility of contaminating fresh water sources.

Therefore still another object of the present invention is to provide an improved method and apparatus for the recovery of oil from shale wherein civil engineering is simplified by virtue of compactness irrespective of the paths of wind storms which add extra costs to the project of oil recovery from shale.

It is another object of the instant invention to provide an improved method and apparatus for the recovery of oil from shale wherein the capital costs are greatly reduced from capital costs proposed.

It is still an object of the present invention to provide an improved method and apparatus for the recovery of oil from shale wherein the risks to damage the environment and pollute the water systems of the Western United States are minimized by compressing and sealing the spent materials resulting from the pyrolysis of shale and by retiring the compressed and sealed materials in the form of blocks into the mine safely and economically.

It is therefore another object of the instant invention to provide an improved method and apparatus for the recovery of oil from shale wherein the number of permits required for the mining of shale and the recovery of oil from shale is greatly reduced in order to expedite the recovery of oil from shale in the most expeditious manner in order to help make the United States independent from foreign exploitation imposed by the OPEC countries.

It is yet another object of the present invention to provide an improved method and apparatus that will recover a barrel of oil from shale at the lowest cost and compete with foreign importation by employing temperature controlled conditions in a retort using a series of induction coils surrounding a shale bed contained in a cluster of cells whose internal walls are in direct contact with the shale to heat the shale uniformly, irrespective of the diameter size of said retort.

Other objects of this invention will appear from the following detailed description and appended claims. Reference is made to the accompanying drawings forming a part of this specification wherein like reference characters designate corresponding parts in the various views.

BRIEF DESCRIPTION OF DRAWINGS

FIG. 1 is a schematic three dimensional drawing of the retort to pyrolyse the shale. It shows a crown, a shaft, a ram-ejector and a block-press with its heat recovery system to remove heat from the spent shale during the formation of blocks.

FIG. 2 is a vertical section taken through the retort which pyrolyses the shale. It shows in section a crown, a shaft, a rotary-ejector, a heat recovery system to remove heat from the spent shale and a block-press, the heat recovery portion of the cycle taking place prior to the block formation.

FIG. 3 is a view taken along 3—3 of FIG. 2. It shows a sectional plan view of the crown of the retort.

FIG. 4 is a view taken along 4—4 of FIG. 2. It shows one of a plurality of cells horizontally sectionalized; the shale is contained within each cell and heated by the internal walls of the cells.

FIG. 5 is a horizontally sectionalized cell, showing additional heating fins protruding from the internal walls of the cell to further enhance the heating capacity of the retort.

FIG. 6 is a detailed partial vertical section of the retort showing structural details and enclosure to keep the retort gas tight.

FIG. 7 is a detailed partial section of the block-press taken vertically. It shows the reciprocating motion of the press to compress the spent shale into blocks while at the same time recover the sensible heat from the spent shale during the formation of the blocks.

FIG. 8 is a section taken at 8—8 of FIG. 2. It shows the outline of the rotary-ejector which removes the spent shale from the shaft after pyrolysis.

FIG. 9 is a view taken at 9—9 of FIG. 2. It shows in section the water cooled portion of a vibratory pan used for cooling the spent shale before the feeding of the shale into the block-press, this arrangement being a variation of that shown by FIG. 1.

FIG. 10 is a view showing the outline of a block formed by compression of the spent shale in a block-press for retirement into the mine so that no damage to the environment is caused.

FIG. 11 is a view showing the manner in which the formed block is delivered to the mine and handled for orderly disposal of the spent shale.

FIG. 12 shows a diagrammatic representation of the stacking of the blocked spent shale in the mine for safe disposal.

Figure 13:
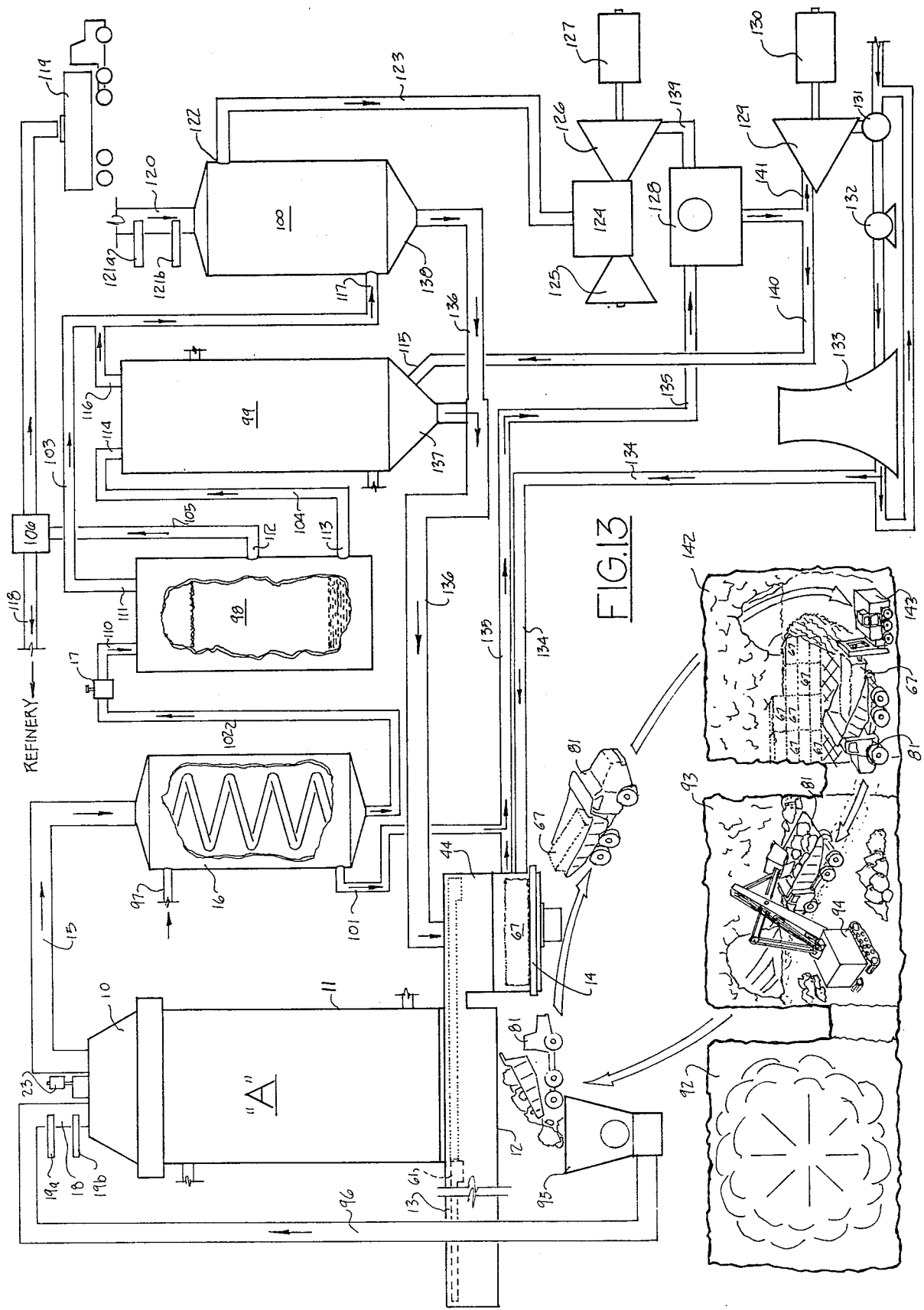
FIG. 13 is a diagramatic view showing the process. It shows the mining of the shale, the retorting thereof, the upgrading of the oil, the electric power generation needed for the operation, and the orderly disposal of the spent shale without causing damage to the environment.

Before explaining in detail the present invention it is to be understood that the invention is not limited to the details of construction and the arrangement of the parts illustrated on the accompanying drawings since the invention is capable of other embodiments. Also it is to be understood that the phraseology or terminology herein contained is for the purpose of description and not limitation.

DETAILED DESCRIPTION OF DRAWINGS

In FIG. 1 reference letter "A" represents the retort in which the pyrolysis cycle takes place. Retort "A" which takes the form of a vertical tower possesses a crown 10 for receiving and distributing the shale charged and also for evacuating the volatilized oil and gases from the heated shale, a shaft 11 for pre-heating and pyrolysis of the shale, and a bottom 12 which is sub-divided into two parts, namely the spent shale ram-ejector 13 and the block-press 14. Retort "A", above crown 10, possesses gas off-take 15 to direct the volatilized oil and non-condensable gas to condenser 16 for the first step in the upgrading of the recovered oil. Downstream of condenser 16, pressure regulator valve 17 is located.

As shown in FIGS. 1, 2 and 3, crown 10 possesses chute 18 to deliver crushed shale to retort "A", the delivery of the shale is controlled by double valve 19a and 19b. Within crown 10, distribution hopper 20 to contain the shale for delivery into shaft 11 is disposed. Crushing rotors 21a and 21b used for crushing the rich caking shale within hopper 20 feed the shale uniformly into shaft 11. Partition 22 which is also located within hopper 20 serves to limit carry-over of dust with the volatilized oil and non-condensable gas. Distribution hopper 20 is refractory lined to maintain the temperature preferably around 900° F. to minimize tar condensation as well as the cracking of the oil within crown 10. Rotors 21a and 21b are driven in opposite direction by drive 23 to crush and break up caking shale. As shown in FIG. 2, for ease of maintenance crown 10 is mounted on car 24 which car runs on track 25. Car 24 is preferably equipped with lifting jacks 26a and 26b in order to make possible the hoisting of crown 10 in a single assembly from above shaft 11. Crown 10 is flange-bolted to shaft 11 by means of bolts 27.

As also shown in FIGS. 1, 2 and 6, shaft 11 comprises the following: (a) Cell section 28, (b) Upper support 29 for cell section 28, (c) Lower support 30 for cell section 28, (d) Induction heating coil means 31, and (e) Insulation 32. Cell section 28 is divided into two parts, part 33 which serves for drying and pre-heating of the shale and part 34 which serves for pyrolysis of the shale. Cell section 28 which extends substantially the entire height of shaft 11 consists of a cluster of tubes preferably round in configuration such as tube 35. Each tube in the cluster forms a separate and isolated cell or compartment within which the drying, preheating and pyrolysing takes place. Cell 35 which possesses thick walls made of a high temperature resistant material such as a heat resistant alloy, graphite, or high silicon iron to withstand the pyrolysing temperature of shale. One of the main factors controlling the productivity of retort "A" is the number of cells contained within shaft 11. Each cell such as tube 35 has a relatively small capacity in itself but when a plurality of cells is assembled in a cluster, the capacity is increased accordingly. Cell 35 may be tapered to diverge downwardly to minimize bridging as the shale moves downwardly within each cell. Each cell such as cell 35 has inner wall 36 and outer wall 37. Insulation 38 surrounds outer wall 37 to minimize heat loss, maintain inside wall 36 hottest in order to drive the heat towards the inside of cell 35 where the shale is contained, and eliminate the possibility of having the short-circuiting or arc-ing to take place between adjacent cells. The outer walls of cells 35 are insulated and isolated from each other both thermally as well as electrically whilst the shale never coming in contact with any of the insulation interposed between the cells.

In order to guarantee uniform and efficient heating in a large diameter retort for the commercial scale extraction of oil from shale, such as a retort measuring 40 to 50 feet in diameter to make the recovery of oil competitive, I provide a cluster of cells bunched together, yet insulated and isolated from each other with induction coil means 31 surrounding the entire cluster rather than each cell surrounded by a coil. In so doing, I have discovered that when current flows through coil means 31, I heat each cell individually, efficiently and uniformly irrespective of the number of cells contained in the cluster and irrespective of the location of any cell within the cluster, without the necessity of any physical electrical connection. This is so as long as each cell is insulated and isolated both electrically and thermally from its adjacent cell. Evidence to this effect is demonstrated in Exhibit 1 mentioned hereinbefore, and also by the attached letter from Professor St. Pierre of Ohio State University to Dr. Dennis, Vice President of A.I.S.I. dated May 1, 1980 and marked Exhibit 2. This work was done in conjunction with the direct reduction of iron oxide. The height of cells 35 is such that when the shale which is charged in crown 10, reaches the bottom of shaft 11, the shale is dried, pre-heated and pyrolysed in a controlled manner to result in the highest yield with minimum formation of coke.

Each cell is supported at the top by upper support 29 and held in place at the bottom by lower support 30. Upper support 29 which may be water-cooled is made in the form of a tube-sheet, as used in heat exchangers such as surface condensers. Lower support 30 is preferably water-cooled and also made in the form of a tube-sheet. By way of example details of design for supports 29 and 30 are shown in FIGS. 2 and 6 which shall be described in detail later in this description.

Induction coil means 31 is made up of a plurality of coils spaced apart in such a way as to provide zonal heating in order to give maximum control. Coils 31 are water-cooled and are tied to a suitable source for power. Electric shunting such as shunt 40, as shown in FIG. 6, is also provided to insure that the flux outside coil 31 is controlled in order to prevent the overheating of physical structures outside coil 31. Since coils 31 are water-cooled, insulation 32 is interposed between coils 31 and the cells 35.

Referring to FIG. 6 for a more detailed description of the mounting of cells 35 in shaft 11 and also the preferred arrangement for operation of retort "A" under pressure, upper support 29 is a plate which is preferably water-cooled and with a plurality of holes whose diameter is slightly larger than the outside dimension of cell 35 including its insulation 38. Lower support 30 which is made with the same number of holes as upper support 29 is preferably made with spotface holes 41. The number of holes in support 29 or support 30 is dictated by the number of cells 35. Within each spotface hole 41, refractory ring 42 is disposed. Cell 35 which possesses flange 43 at its lower extremity rests on refractory ring 42 and in this manner cell 35 is supported at the bottom on flange 43 and guided at the top with the provision to permit cell 35 to expand and grow in the upward direction upon heating. Lower support 30 is preferably water-cooled in order to give good life to refractory ring 42. A refractory material such as castable mortar 44 is poured in the clearance between cells 35 and upper tube sheet 29 so as to give intermediate support to upper tube sheet 29 and also provide individual refractory housing 45 which is poured into place to make a honey comb-like construction of refractory to contain each cell 35 with its insulation. When replacing a cell, housing 45 remains in place. Outer shell 47 which is provided for sealing, is flange-mounted to both crown 10 and supporting bed 12. A seal such as gasket 48 is disposed between flanges 49 and 50 to insure the prevention of gas leakage. It is desirable to pressurize retort "A" to increase the efficiency of the system.

Referring to FIGS. 1, 6 and 7 again, beneath shaft 11, supporting bed 12 is located. This bed which is in the form of a heavy structure serves to support the entire weight of the charge. Preferably bed 12 is water-cooled as for example by passages 51 shown in FIG. 6. To one side of supporting bed 12 is ram-ejector 13 and to the other is block-press 14. Ram-ejector 13 which pushes the spent shale from the bottom of shaft 11 into feed hopper 44 possesses ram 61 which is equipped with pushing head 62. Head 62 is provided with passage 63 for water-cooling. Ram 61 is moved to and from feed hopper 44 on track wheels 64 running on rails 65. Enclosure 66 encloses the entire assembly of ram-ejector 13. When operating shaft 11 under positive pressure outer shell 47, see FIG. 6, is flange bolted to crown 10, to bottom 12, to ram-ejector 13 and to feed hopper 44 of block-press 14, and in this manner retort "A" is fully sealed to prevent gases from escaping into the atmosphere.

Block-press 14 preferably comprises a dual pocket feed hopper 44, reciprocating compression-head 52, mold chambers 53a and 53b and roller conveyors 54a and 54b. Referring to FIGS. 1 and 7, feed hopper 44, possesses two pockets 55a and 55b, pocket 55a is adapted to feed spent shale to mold chamber 53a and pocket 55b is adapted to feed spent shale to mold chamber 53b. Both pockets 55a and 55b are made to have inclined sides to effectively feed spent shale by gravity. Mold chamber 53a is made up of a five sided-structure: top 56a, bottom 57a, two sides 58a and 59a and an end 60a. Mold chamber 53b is made up the same as mold chamber 53a with top 56b, bottom 57b, two sides 58b and 59b and end 60b. Top 56a, bottom 57a, and sides 58a and 59a of mold chamber 53a and top 56b, bottom 57b and sides 58b and 59b of mold chamber 53b are preferably made fixed. Ends 60a and 60b are made in the form of gates adapted to be raised by means of cylinders 68a and 69a for gate 60a and 68b and 69a for gate 60b, for the ejection of blocks, such as rectangular block 67, pressed from the shale. The volume of the spent shale is reduced by compression to make a uniform shape in order to make possible the disposal of the spent shale in the mine rather than spreading it in the countryside. This method of disposal overcomes the problems of reclamation by revegetation which demands great quantities of water which the West cannot spare.

The ends opposite end 60a and 60b are left open in order to provide entry for reciprocating compression-head 52 into mold chamber 53a and 53b and also entry for spent shale from feed pockets 55a and 55b. Compression-head 52 is given reciprocal motion by means of rack 70 and pinion 71 actuated by drive 72. Compression-head 52 is water-cooled. The top, ends and sides of feed hopper 44 and the tops, bottoms, sides and ends of mold chamber 53a and 53b are made in the form membrane-tube construction simulating boiler panels in order to make steam from the heat extracted from the hot spent shale being ejected from shaft 11 by means of ram-ejector 13. The formation of block 67 is carried out progressively, by compressing alternately a fraction of spent shale at a time within mold chambers 53a and 53b until the whole block 67 is formed. This is done to maximize heat extraction from the spent shale. Hoses 73 are provided to make the necessary connections to handle the steam generated from the sensible heat of the spent shale. Certain shales may require a binder to form a strong and stable block. Binder dispensing means 74 is provided preferably above feed hopper 44 when a binder is needed. Control 75 meters the amount of binder that is needed. The binder is distributed by means of manifold 76.

Block 67, is compressed with two cored holes 76 and 77 for handling purposes with a heavy duty fork-lift truck in the mine to facilitate stacking for permanent retirement. Mechanism for coring holes 76 and 77 is denoted by numeral 78 in FIG. 1. A spraying system 79 for dispensing a sealing compound made from a non-biodegradable material is provided to spray the entire blocks, such as block 67, as they are ejected from block-press 14. The sealer makes the surfaces of every block impermeable to water. Blocks 67 can be directly taken to the mine or left outdoors to age after having been sealed. Whether blocks 67 are left out to age or taken to the mine without aging, loading means 80 is used to lift block 67 from either conveyor 54a or 54b and set it on truck 81. It is preferred to make a block large enough so that one block fits the bed of one truck.

Referring to FIGS. 2, 8 and 9, instead of using ram-ejector 13, as shown by FIG. 1, rotary-ejector 82 is provided at the bottom of shaft 11. Rotary-ejector 82 is actuated by means of drive 83, driving miter-gear assembly 84. The spent shale is fed into a series of vibrating pans, such as pan 85 which is designed to be cooled with water circulating in chamber 90 in order to remove the heat from the spent shale. Chamber 90 is provided with diaphrams 91 to properly distribute the cooling water for efficient heat removal. Pan 85 can be designed for high pressure steam generation by using the principle of membrane-tube construction. In order to give adequate residence time, the spent shale is vibrated sequentially by means of vibrator 86 from pan 85a to pan 85b, from pan 85b to pan 85c, and from pan 85c to pan 85d thence to hopper 87 which is equipped with gate valves 88a and 88b. The cold spent shale is fed from hopper 87 to conveyor 89 which conveys the spent shale to block-press 14 to make blocks 67.

In order to enhance the heat transfer to the shale and expedite the pyrolysis, cell 35, as shown in FIG. 5, is provided with inner wall 36, outer wall 37, insulation 38 and internal fins 39. As wall 36 gets hot, so do fins 39 within cell 35. This arrangement carries the heat farther into the shale contained in the cell and the heating of the shale located towards the center of cell 35 is heated at a much faster rate than if no fins are provided. Fins 39 are spaced apart at such a distance as not to interfere with the downward movement of the shale during its pyrolysis.

Referring to FIG. 12, numeral 107, represents the mine floor and 108 a levelling filler to grade floor 107 so it is fairly horizontal. A heavy water-proof cover 109 which is non-biodegradable is laid on filler 108 in order to isolate blocks 67 from ground 107 so as to prevent leaching to occur from blocks 67 in the event the sealing material covering the outside of each block 67, fails. In this manner double protection is provided to the system to guarantee that no water contamination takes place. In the event additional protection is necessary after the stacking of the blocks is completed in a unit which would measure as for example 60 feet high by 300 feet square, the whole unit is encapsulated by spraying an additional coating of a sealant in the mine to make the entire unit impermeable to water.

Referring to the total process shown diagramatically in FIG. 13, the main parts of the process are mining, retorting, oil upgrading, power generation and disposal of spent shale. In the mining portion, there is mine chamber 92 where blasting takes place to rubblize the shale. In a next chamber 93, where the shale is in rubble form, a shovel 94 is provided to load the blasted shale on a fleet of dump trucks such as truck 81. Crusher 95 suitably located receives the shale from the mine to crush it to roughly minus ½ inch and conveyor 96 elevates the crushed shale from crusher 95 to crown 10 of retort "A". In the retorting portion, Retort "A" was described in detail above. The oil upgrading portion comprises condenser 16 and separator 98. Gasifier 99 and desulfurizer 100 are added in order to make use of the residue of the oil and to purify the gas. Condenser 16 which receives the raw gas in the form of condensables and non-condensables from Retort "A", possesses means for cooling water entry 97 and means for hot water exit 101. Condenser 16 is connected to separator 98 by means of pipe 102. Pressure regulator valve 17 is located between condenser 16 and separator 98. Separator 98 which separates the condensables from the non-condensables is equipped with inlet 110 and three outlets, namely outlet 111, 112 and 113. Outlet 111 is for the non-condensables, 112 is for the oil and 113 is for the residue of the oil. Instead of wasting the non-condensables by means of pipe 103 they are directed to desulfurizer 100 to be purified. The residue or "bottoms" as it is commonly termed are preferably recovered in this manner. Pipe 104 is used to interconnect outlet 113 of separator 98 to inlet 114 of gasifier 99. Gasifier 99 may take the configuration and structure, with possibly some modifications, of the gasifier of the applicant described in a co-pending patent application filed on May 27, 1980 and bearing Ser. No. 06/153/159. This gasifier also uses the principle of induction heating as proposed herein for Retort "A". Gasifier 99 is provided with steam inlet 115 and gas outlet 116. It is preferred to have the gas from gasifier 99 join the non-condensables from separator 98 and both gases enter desulfurizer 100 at inlet 117 for purification.

As stated, separator 98 is provided with outlet 112 for the delivery of the oil recovered from the pyrolysis of the shale. Downstream of outlet 112, pump 106 is located whilst pipe 105 ties outlet 112 to pump 106. This pump delivers the oil either to pipeline 118 or to tank truck 119 for refining. The purification of the combined gases made up of the non-condensables and the gas recovered from the residue, takes place in desulfurizer 100. Desulfurizer 100 possesses charging pipe 120 and double valve arrangement 121a and 121b to feed a desulfurizing agent such as CaO or $Fe_2O_3$ into desulfurizer 100. Desulfurizer 100 possesses inlet 117 for the entry and outlet 122 for the exhaust of the combined gases. Gasifier 99 is provided with a mineral (ash) collection bottom 137 to contain the minerals left over from the residue of the shale oil recovered. Desulfurizer 100 is also provided with a collection bottom 138 to contain the spent desulfurizing agent such as $Fe_2S_3$. In order to dispose of the minerals from the residue and the spent desulfurizer, it is preferred to provide conveying means 136, to collect both the minerals from gasifier 99 and the spent desulfurizing agent from the desulfurizer 100 and deliver them to hopper 44 to be fed into block-press 14 for encapsulating them within blocks 67.

The portion pertaining to the generation of electric power which uses the combined cycle principle begins with gas delivery 123 and combustion chamber 124. To one side of combustion chamber 124 air compressor 125 is located and to the other side gas turbine 126 which turbine ties to generator 127. Waste heat boiler 128 is located downstream of turbine 126. The spent gases from turbine 126 are delivered to boiler 128 by means of duct 139. Steam and hot water from both condenser 16 and block-press 14 are received by waste heat boiler 128 by means of duct 135; in so doing boiler 128 makes use of the heat recovered from the spent shale and from the condensation of the volatilized oil to provide an efficient energy system. The steam from the waste heat boiler which may be at 600 psi and 700° F. is fed into gasifier 99 by means of duct 140 and into steam turbine 129 by means of duct 141. Turbine 129 is connected to electric generator 130. Condenser 131 is downstream of steam turbine 129 to provide the vacuum for the collapse of the steam. Pump 132 is used to pump the condensate to cooling tower 133. Cooled water delivery system 134 ties cooling tower 133 to block-press 14 and to induction coils 31 of Retort "A".

The portion pertaining to the disposal of spent shale comprises mine chamber 142, fork-lift truck 143, block-press 14 and delivery dump truck 81. While the operation of the improved method and apparatus of the instant invention may be comprehended from a study of the foregoing description, it is believed that the operation may be further explained as hereinafter set forth.

OPERATION

Referring to the drawings and assuming that the process is already in progress, as previously stated the recovery of shale oil can generally be divided into five parts: mining, retorting, upgrading, power generation and disposal. The shale is mined from connecting chambers progressively. Within the mine three main operations take place. Blasting, removal of the rubble and retiring of the spent shale. As shown in FIG. 13, chamber 92 is being blasted, chamber 93 is being emptied of the rubblized shale rock and chamber 142 is being reclaimed by stacking blocks of spent shale which were compressed into a suitable shape after the extraction of the oil in the retort. In chamber 93, shovel 94 loads the rubble onto the bed of dump truck 81. Preferably, the crushing, retorting, upgrading and power generation are done outside the mine. A fleet of heavy duty dump trucks move the rubblized shale out of the mine and bring back the blocks of spent shale for retirement. The movement of a dump truck 81, will be followed sequentially to describe in detail the operation.

Truck 81 is loaded in chamber 93, and once full of shale, it travels out of the mine to crusher 95. Truck 81 dumps the shale rock into the hopper of crusher 95 and departs to Retort "A" where loading device 80 loads block 67 into its body as shown in FIG. 1. Truck 81 returns to the mine and stops in chamber 142 shown in FIG. 13, where fork-lift 143 removes block 67 from the body of truck 81 and stacks it onto other blocks in an orderly fashion and on a floor which was levelled to form a flat base made impermeable to water. As soon as block 67 is off the body of truck 81, truck 81 travels to chamber 93 to be loaded again with rubblized shale rock and the cycle is repeated. The logistics are such that the time it takes to unload block 67 from truck 81, it takes shovel 94 to load truck 81 with shale. Besides the fleet of trucks 81 there is also an adequate number of fork-lifts in order to keep up with the required production rate. Two other important intermediate steps also take place which are not shown in the drawings. The first is that after blasting, the walls of the mines are scaled, that is the loose rock is removed from the walls, and the second is that the floor of the chamber after being emptied of the rubble is levelled to form the flat base and also waterproofed in preparation of stacking blocks 67.

Once the shale is crushed to minus ½ inch, conveyor 96 elevates the crushed shale and it is fed into Retort "A" through chute 18 using double valve mechanism 19a and 19b which work on the principle of a lock hopper. The crushed shale is fed in one of several ways including a screw conveyor. The shale falls into compartment 144 as shown in FIG. 2. Rotor arms 21a and 21b scoop the shale from compartment 144 and distribute it into cells 35. Since the temperature of chamber 20 is elevated, any shale that tends to cake and bloat is crushed by the rotor arms since rotor 21a rotates in opposite direction from rotor 21b. It is important to keep a depth of crushed shale of a few feet above the top of cells 35 so that there is always material to take the space of spent shale which is removed from the bottom of shaft 11 by either ram-ejector 13 FIG. 1 or rotary ejector 82 FIG. 2.

Walls 36 of cells 35 are kept hot by induction coils 31. As is stated above, each cell serves as an isolated chamber with no contact either thermally or electrically with its adjacent cell. A great number of cells such as 200 cells are clustered within shaft 11 to form a very large production unit without the concern of channelling and without concern of heat transfer. Crushed shale is a bad conductor of heat, therefore by dividing the shale into cellular columns contained within cells whose walls are heated rapidly, uniformly and in zones without the interposition of an insulator between the heated walls and the shale, the shale is most efficiently pyrolysed during its descent within shaft 11. This construction removes the possibility of short-circuiting and arc-ing of the heated walls of the cells, there is no concern of wear since the material from which the cells are made is abrasive resistant and the possibility of bridging is minimized by having the cells free and with no obstruction. The possibility of bridging is completely removed by tapering the cells so that the inside dimension of cell 35 at the top is smaller than the dimension at the bottom. Since the heating of the walls of cells 35 is in zones, very close control is reached. This feature makes for the maximum oil yield from the shale by not causing the burning of some of the oil, by keeping the coking of the oil at a minimum and by eliminating the cracking of the oil. These three results make for the maximum yield of oil from the shale. Thermo-couples (not shown) are imbedded within the walls of cells 35 at the various zones to automatically control the power input in coils 31 so that the temperature of the inside walls of cells 35 is kept at optimum. Fins 39 protruding from walls 36 further enhance the heat transfer into the shale to increase efficiency of heating and thereby overcome the poor conductivity of the crushed shale. The height of cells 35 is determined by the residence time it takes to pyrolyse the shale. The cells are designed of such a height as 30 to 40 feet in height, so that by the time the shale reaches the bottom of shaft 11, practically all the oil in the shale has been volatilized.

Referring to FIGS. 1, 6 and 13, ram-ejector 13, keeps ejecting spent shale into hopper 44 and compression head 52 keeps compressing the spent shale alternately within mold-forms 53a and 53b to form block 67 incrementally on each side of compression-head 52, in order to maximize heat extraction from the hot spent shale and remove the bulk of the sensible heat contained in the spent shale. During the formation of the blocks, core 78 is inserted into mold-form 53a (a similar core is also inserted into mold-form 53b) to form lifting hole 76 and 77 (see FIG. 10) for the engagement of the forks of fork-lift 143 (see FIG. 11). Once block 67 is formed, core 78 retracts, and either end-gate 60a or 60b is raised and block 67 is ejected from either mold-form 53a or 53b, and transported by conveyor 54a when ejecting from mold-form 53a and by conveyor 54b when ejecting from mold-form 53b as shown in FIG. 1. In the event certain spent shales need a binder to hold the integrity of blocks 67, a binder is added to the spent shale and an automatic system as for example system 74, dispenses the right amount of binder as needed. After the ejection of block 67 from either mold-form 53a or 53b onto conveyor 54a or 54b, block 67 is sprayed with a sealing compound which is non-biodegradable in order to encapsulate the spent shale and make it completely impermeable to water. If there is need to leave block 67 to age, a transitional area is provided for this purpose whence after aging of the blocks, they are transported to the mine for permanent retirement.

The upgrading of the oil takes place as follows: The volatiles and the non-condensables leave Retort "A" through duct 15 and they enter condenser 16 whence the oil and the non-condensables are separated in separator 98. The non-condensables are purified in desulfurizer 100 while the oil is pumped by means of pump 106 to the refinery via pipe-line 118 and in a small operation via tank truck 119. The residue from the oil or bottoms, is collected at the bottom of separator 98 and thence it is directed as a slurry to gasifier 99 where the oil is volatilized and the residual coke is gasified. The raw gas from the gasifier is also desulfurized in desulfurizer 100. The minerals (ash) from the gasifier and the spent desulfurizing agent are conveyed to hopper 44 for inclusion into the spent shale for disposal by being incorporated in blocks 67. The combined gas from the non-condensables and the gas from the gasifier after desulfurization are used to burn in combustion chamber 124 for power generation using the principle of gas turbine 126, waste heat boiler 128 and steam turbine 129. The hot water or steam made from the waste heat of the spent shale during block pressing is directed to waste heat boiler 128 in order to make use of the sensible heat from the spent shale. In this manner the electric power needed to operate induction coils 31 of Retort "A", the induction coils of gasifier 99 and all the other power needed for the complex is made mainly from three sources of energy: from the non-condensables, the residue of the oil and the waste heat from the spent shale. The combined-cycle power generation used herein further adds to the efficiency of the process of recovering oil from shale.

To recover oil economically from this country's second most abundant energy resource, scores of complexes capable of recovering 50,000 barrels of oil per day from shale are needed. For such a single complex, 70,000 tons of shale rock must be mined and processed daily. This also requires the disposal of 60,000 tons of spent shale in a manner as not to harm the environment taking into account that the spent shale increases in volume by 40% after the shale is processed. In order to accomplish this, a battery of five retorts, with four operating at the same time and one on stand-by, is required. In addition, the complex must produce and retire every 24 hours, 2000 blocks weighing 30 tons each. From the foregoing detailed disclosure, it is evident that the instant invention is capable of doing this. Further, this invention is a contribution of great significance to the art of producing energy from alternative sources which this country so badly needs in order to make the United States less dependent on foreign oil imports. This invention has the potential of producing energy in the form of liquid fuels without causing damage to the environment, of improving this country's defense posture and of conserving capital. All in all, it is submitted that the present invention provides an improved and useful method and apparatus for the recovery of oil from shale that is capable of producing large enough quantities of oil efficiently and economically to meet the urgent needs of the country. From the methods now in use, it is evident that this invention is novel.

I claim:

1. A method of recovering oil from shale comprising the steps of:
   (a) charging shale into a plurality of compartments whose walls comprise a material which is adaptable to being heated by induction and wherein said plurality of compartments commonly share an induction coil means which surrounds said plurality of compartments and said induction coil means does not individually surround any of said compartments;
   (b) heating said walls of said compartments by said induction coil means to cause the pyrolization of said shale contained within each compartment to result in the driving of the gaseous and volatile matter from said shale;
   (c) collecting said gaseous and volatile matter; and
   (d) discharging the spent shale from said plurality of compartments after pyrolization.

2. The method as set forth in claim 1 wherein said step of heating said walls of said compartments by induction coil means is further characterized by the step of isolating each compartment of said plurality of compartments in such a way as to have each compartment isolating separated from its adjacent compartment.

3. The method as set forth in claim 2 wherein said step of isolating each compartment of said plurality of compartments is further characterized by the step of thermally insulating each compartment of said plurality of compartments in such a way as to have the loss of heat from each compartment reduced to a minimum in order to efficiently drive the heat from the walls of each compartment to the shale contained within each compartment.

4. The method as set forth in claim 2 wherein said step of isolating each compartment of said plurality of compartments is further characterized by the step of electrically insulating each compartment of said plurality of compartments in such a way as to have the short-circuiting of the magnetic flux from one compartment to an adjacent compartment reduced to a minimum in order to uniformly heat the walls of said compartments.

5. The method as set forth in claim 1 wherein said step of heating said walls of said compartments by said induction coil means is further characterized by the step of locating each compartment of said plurality of compartments outside the confines of the other compartments.

6. The method as set forth in claim 1 wherein said step of charging shale into said plurality of compartments is further characterized by the step of distributing the shale charged into said plurality of compartments in such a way as to have substantially the same amount of shale delivered to each compartment of said plurality of compartments.

7. The method as set forth in claim 6 wherein said step of distributing the shale charged into said plurality of compartments is further characterized by the step of crushing the shale that cakes, in order to break it up so that it can be fed into said compartments.

8. The method as set forth in claim 1 being further characterized by the step of operating said plurality of compartments under a positive pressure.

9. The method as set forth in claim 8 wherein the step of operating said plurality of compartments under a positive pressure is further characterized by the step of enveloping said plurality of compartments inclusive of the induction surrounding said plurality of compartments by an external envelope to contain gas and prevent pollution.

10. The method as set forth in claim 1 wherein said step of discharging the spent shale from said plurality of compartments after pyrolization is further characterized by the step of cooling said spent shale.

11. The method as set forth in claim 10 wherein said step of cooling said spent shale is further characterized by the step of compressing the waste heat from the spent shale.

12. The method as set forth in claim 11 wherein said step of cooling said spent shale is further characterized by the step of compressing said spent shale into a predetermined block form for ease of disposal.

13. The method as set forth in claim 12 wherein said step of compressing said spent shale into a predetermined block is further characterized by the step of recovering waste heat from said spent shale takes place during the compressing of said spent shale.

14. The method as set forth in claim 12 wherein said step of compressing said spent shale into a predetermined block is further characterized by the step of forming said block by compression incrementally in order to subject the spent shale to maximum surface exposure to result in efficient heat removal.

15. The method as set forth in claim 14 wherein said step of forming said block by compression incrementally is further characterized by the step of adding a binding compound to said spent shale prior to compressing it.

16. The method as set forth in claim 12 wherein said step of compressing said spent shale into a predetermined block form is further characterized by the step of sealing said block to make it impermeable to water.

17. The method as set forth in claim 12 wherein said step of compressing said spent shale into a predetermined block form is further characterized by the step of coring cavity means within said block for ease of handling.

18. The method as set forth in claim 12 wherein the step of compressing said spent shale into a predetermined block form is further characterized by the step of transporting said block to the mine whence the shale was rubbelized and storing said block on a floor base waterproofed with a nonbiodegradable covering in order to isolate the spent shale and prevent the contamination of water.

19. The method as set forth in claim 11 wherein said step of compressing said spent shale into a predetermined block form for ease of disposal is further characterized by the step of returning said block form back to the mine in order to prevent damage to the environment and to prevent the consumption of water for revegetation.

20. The method as set forth in claim 1 wherein said step of collecting said gaseous and volatile matter is further characterized by the step of desulfurizing said gaseous and volatile matter.

21. The method as set forth in claim 1 wherein the step of heating said walls of said plurality of compartments by said induction coil means is further characterized by the step of controlling the heat input into said compartments in such a way as to cause the heating of said compartments in zones.

22. The method as set forth in claim 1 wherein said step of heating said walls of said plurality of said compartments by said induction coil means to cause the pyrolysis of shale contained within each compartment of said plurality of compartments is further characterized by the step of subjecting the shale contained in said compartments to supplemental heating surfaces disposed within each of said compartments.

23. The method as set forth in claim 1 wherein the step of heating said walls of said compartments by said induction coil means to cause the pyrolization of the shale contained within each compartment of said plurality of compartments is further characterized by the step of subjecting the contents of said compartments to a divergent downward feed to reduce the effects of bridging.

24. The method as set foth in claim 1 wherein the step of charging shale into a plurality of compartments is further characterized by the step of containing the products of pyrolization to prevent pollution during charging.

25. The method as set forth in claim 1 wherein he step of discharging spent shale from said plurality of compartments is further characterized by the step of containing the products of pyrolization to prevent pollution.

26. The method as set forth in claim 1 wherein the step of collecting said gaseous and volatile matter is further characterized by the step of separating the condensables from the noncondensables.

27. The method as set forth in claim 26 wherein the step of separating the condensables from the noncondensables is further characterized by the step of consuming the noncondensables for the generation of electric power.

28. The method as set forth in claim 26 wherein the step of separating the condensables from the noncondensables is further characterized by the step of removing the residual solids from said condensables.

29. The method as set forth in claim 27 wherein the step of removing the residual solids from said condensables is further characterized by the step of gasifying said residual solids for useful proposes while leaving the mineral contained in said residual solids.

30. The method as set forth in claim 29 wherein the step of leaving the mineral contained in said residue is further characterized by the step of including said mineral in the spent shale in such a way as to result in the joint disposal of said mineral and said spent shale.

31. The method as set forth in claim 29 wherein the step of gasifying said residual shale is further characterized by the step of purifying the gas so generated with a desulfurizing agent.

32. The method as set forth in claim 31 whrein the step of purifying the gas so generated with a desulfurizing agent is further characterized by the step of disposing of said desulfurizing agent when spent with the spent shale.

33. The method as set forth in claim 32 wherein the step of purifying the gas so generated with a desulfurizing agent is further characterized by the step of burning said gas in a turbine to produce electric power.

34. The method as set forth in claim 27 wherein the step of removing the residual solids from said condensables is further characterized by the step of recovering the remainder of the condensables to result in the upgraded oil from said shale.

35. The method as set forth in claim 1 whrein said step of collecting said gaseous and volatile matter is further characterized by the step of employing at least some of said gaseous and volatile matter for the drying and preheating said shale.

36. The method as set forth in claim 35 wherein the step of employing at least some of said gaseous and volatile matter for the drying and preheating said shale is further characterized by the step of maintaining the temperature of said gaseous and volatile matter above the condensation temperature of gaseous and volatile matter immediately following the step of drying and preheating of said shale.

37. A method of recovering oil from shale comporising the step of charging shale into a retort, pyrolizing said shale in said retort to result in the driving of the gaseous and volatile matter from said shale, collecting said gaseous and volatile matter, compressing the spent shale into a dense predetermined block form to facilitate disposal and thus overcoming the problem of increased volume after pyrolysis, and transporting said block form to a storage location thereby obviating the necessity for the revegetation of spent shale disposal sites which revegation requires excessive quantities of water.

38. The method as set forth in claim 37 wherein the step of compressing the spent shale into a dense predetermined block form is further characterized by the step of sealing said block form to render it impermeable to water.

39. The method as set forth in claim 37 wherein said step of compressing the spent shale into a dense predetermined block form is further characerized by the step of recovering heat from the spent shale.

40. The method as set forth in claim 37 further characterized by the step of operating it on a continuous sequence.

41. The apparatus as set forth in claim 37 further characterized by the step of operating it on a semi-continuous sequence.

42. The method as set forth in claim 37 wherein said step of transporting said block form to a storage location is further characterized by the step of moving said block form back into the mine whence said shale came from.

43. The method as set forth in claim 42 wherein said step of moving said block form back into the mine whence said shale cam from is further characterized by the step of stacking said block form on top of other similar blocks in an orderly fashion on top a floor which is impermeable to water for the safe disposal of the spent shale.

44. The method as set forth in claim 40 wherein the step of stacking said block form on top of other similar blocks in an orderly fashion on top of a floor which is impermeable to water is further characterized by the step of sealing the block forms in place and making them impermeable to water in order to give double protection to the environment.

45. The method as set forth in claim 37 wherein said step of collecting gaseous and volatile matter is further characterized by the step of upgrading said gaseous and volatile matter to oil and gas.

46. The method as set forth in claim 45 wherein said step of upgrading said gaseous and volatile matter to oil and gases is further characterized by the step of generating electric power by means of said gases.

47. A method of recovering oil from shale and disposing of spent shale in a safe way comprising the following steps:
(a) blasting the shale rock in a mine to rubblize it;
(b) hauling the rubble out of the mine;
(c) crushing the rubblized shale;
(d) feeding the crushed shale into a retort;
(e) heating the shale to pyrolize it;
(f) collecting the volatilized oil vapor and noncondensables from the shale;
(g) compressing the spent shale into predetermined block forms to reduce the volume of the spent shale;
(h) sealing said blocks to render them impermeable to water;
(i) preparing the mine to receive said blocks; and
(j) transporting said blocks to the mine whence the shale came from.

48. An improved method of recovering oil from shale in a sealed retort which possesses a vertical shaft using the principle of electric induction heating to pyrolyse the shale without causing pollution to the environment comprising the following steps:
(a) charging shale into said retort without permitting the escape of gases from said retort;
(b) distributing the shale within the shaft of said retort by compartmentalizing the charge into a plurality of individual cells disposed within said shaft so that the quantity of shale contained within each cell is substantially the same;
(c) heating the walls of said cells by means of electric induction in order to efficiently heat the shale contained in each cell by directly transferring the heat from the inside walls of each cell to the shale contained therein without the interposition of insulation between the heated inside walls of said cells and the shale;
(d) preventing the loss of heat from the outside walls of each of said cells by insulating the outside walls of each cell in order to insulate each cell both thermally and electrically from an adjacent cell so that the shale is pyrolized efficiently in each cell independently from the pyrolysis of the shale contained in an adjacent cell so that the possibility of short-circuiting between cells is eliminated;
(e) volatilizing the oil and the gaseous matter contained in said shale in the absence of air;
(f) collecting the volatilized oil and gaseous matter from said retort and cooling them to separate the condensibles from the noncondensibles; and
(g) discharging the spent shale after the pyrolysis without causing pollution, including the step of forming the spent shale into a predetermined block form, and moving the block form to a storage location.

* * * * *